US009380626B2

(12) United States Patent
Tanabe

(10) Patent No.: US 9,380,626 B2
(45) Date of Patent: Jun. 28, 2016

(54) COMMUNICATION APPARATUS, INFORMATION PROCESSING APPARATUS, AND CONTROL METHOD FOR THE SAME

(71) Applicant: CANON KABUSHIKI KAISHA, Tokyo (JP)

(72) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/617,317

(22) Filed: Feb. 9, 2015

(65) Prior Publication Data
US 2015/0237664 A1    Aug. 20, 2015

(30) Foreign Application Priority Data
Feb. 19, 2014    (JP) .................................. 2014-029964

(51) Int. Cl.
H04W 76/02       (2009.01)
G06Q 20/32       (2012.01)
H04W 4/00        (2009.01)

(52) U.S. Cl.
CPC ......... *H04W 76/023* (2013.01); *G06Q 20/3278* (2013.01); *H04W 4/008* (2013.01)

(58) Field of Classification Search
CPC ... H04W 76/023; H04W 4/008; H04W 84/18; G06Q 20/3278
USPC ......................................... 455/41, 41.1, 41.2
See application file for complete search history.

(56) References Cited

U.S. PATENT DOCUMENTS

| 6,195,006 B1* | 2/2001 | Bowers .................. G06K 17/00 340/10.1 |
| 6,776,339 B2* | 8/2004 | Piikivi ................... G05B 19/00 235/375 |
| 6,892,052 B2* | 5/2005 | Kotola ................... G06Q 20/20 340/10.1 |
| 7,072,672 B1* | 7/2006 | Vanska ..................... G06F 8/62 455/414.1 |
| 7,274,909 B2* | 9/2007 | Perttila ................. G01S 13/751 340/10.1 |
| 7,493,082 B2* | 2/2009 | Perttila ............... H04M 1/7253 340/10.1 |

(Continued)

FOREIGN PATENT DOCUMENTS

| EP | 2 106 107 A1 | 9/2009 | ............ H04M 1/725 |
| EP | 2 518 982 A1 | 10/2012 | ............ H04M 1/725 |

(Continued)

OTHER PUBLICATIONS

GB Application No. 1502348.4—GB Search Report dated Jul. 29, 2015.

*Primary Examiner* — Hai V Nguyen
(74) *Attorney, Agent, or Firm* — Fitzpatrick, Cella, Harper & Scinto

(57) ABSTRACT

A communication apparatus comprising: a first communication unit; a second communication unit that is different from the first communication unit; and a control unit configured to control processing in which the first and second communication units are used, wherein the control unit performs control such that information regarding an application needed for processing performed using the second communication unit is sent to a first apparatus using the first communication unit, a signal based on the information regarding the application is received from the first apparatus or a second apparatus connected with the first apparatus using the second communication unit and the application is launched in accordance with the signal, and processing performed using the second communication unit is executed using the launched application.

15 Claims, 10 Drawing Sheets

(56) References Cited

U.S. PATENT DOCUMENTS

| | | | | |
|---|---|---|---|---|
| 7,606,533 B2* | 10/2009 | Perttila | G01S 13/751 | 340/10.1 |
| 7,751,810 B1* | 7/2010 | Bernoske | G06Q 10/02 | 455/41.2 |
| 7,778,593 B2* | 8/2010 | Hsu | H04L 12/189 | 455/3.04 |
| 7,881,709 B2* | 2/2011 | Wakasa | H04M 1/7253 | 455/412.1 |
| 7,894,771 B2* | 2/2011 | Son | G06K 7/10079 | 455/41.2 |
| 8,060,012 B2* | 11/2011 | Sklovsky | G06F 9/445 | 455/41.1 |
| 8,244,179 B2* | 8/2012 | Dua | G06F 17/30058 | 340/10.51 |
| 8,254,835 B2* | 8/2012 | Lee | H04M 1/7253 | 455/41.1 |
| 8,378,790 B2* | 2/2013 | Ryoo | G06K 7/0008 | 235/38 |
| 8,421,599 B2* | 4/2013 | Cho | G06F 17/30879 | 340/10.4 |
| 8,438,235 B2* | 5/2013 | Shaffer | H04L 12/581 | 709/206 |
| 8,537,997 B2* | 9/2013 | Gits | H04L 12/1813 | 370/260 |
| 8,686,860 B2* | 4/2014 | Boldyrev | H04B 5/0031 | 340/572.2 |
| 8,720,771 B2* | 5/2014 | MacKinnon Keith | G06K 5/00 | 235/375 |
| 8,744,347 B2* | 6/2014 | Charrat | G06Q 20/341 | 455/41.1 |
| 8,744,348 B2* | 6/2014 | Fine | G06K 7/0008 | 455/41.1 |
| 8,798,688 B2* | 8/2014 | August | H04B 5/0031 | 455/41.1 |
| 8,890,657 B2* | 11/2014 | Lin | G06F 3/012 | 235/44 |
| 8,917,161 B2* | 12/2014 | August | G06K 7/01 | 340/10.1 |
| 8,929,811 B2* | 1/2015 | Yang | H04W 4/008 | 455/41.1 |
| 8,942,366 B2* | 1/2015 | Gits | H04L 12/1813 | 370/260 |
| 8,953,570 B2* | 2/2015 | Lin | G01S 13/82 | 340/10.1 |
| 9,047,366 B2* | 6/2015 | Mo | G06F 17/30666 | |
| 9,047,759 B2* | 6/2015 | Yamada | G08C 17/02 | |
| 9,135,227 B2* | 9/2015 | Warila | G06F 8/24 | |
| 9,142,116 B2* | 9/2015 | Sattari | G08B 21/22 | |
| 9,142,122 B2* | 9/2015 | Oshima | G08C 17/02 | |
| 2002/0121544 A1* | 9/2002 | Ito | G06Q 20/342 | 235/380 |
| 2002/0165008 A1* | 11/2002 | Sashihara | H04W 88/02 | 455/558 |
| 2003/0017848 A1* | 1/2003 | Engstrom | G06F 1/1626 | 455/558 |
| 2003/0056019 A1* | 3/2003 | Kehr | G06Q 20/341 | 719/310 |
| 2003/0088496 A1* | 5/2003 | Piotrowski | G06Q 30/02 | 705/37 |
| 2004/0010446 A1* | 1/2004 | Vanska | G06Q 30/0261 | 705/14.58 |
| 2004/0033798 A1* | 2/2004 | Robin | H04W 8/22 | 455/419 |
| 2004/0087273 A1* | 5/2004 | Perttila | G01S 13/751 | 455/41.2 |
| 2004/0189635 A1* | 9/2004 | Hoisko | G06Q 10/1093 | 345/424 |
| 2006/0049258 A1* | 3/2006 | Piikivi | G05B 19/00 | 235/451 |
| 2006/0119471 A1* | 6/2006 | Rudolph | G06Q 10/08 | 340/10.41 |
| 2006/0129628 A1* | 6/2006 | Kamiya | G06F 9/468 | 709/203 |
| 2006/0168644 A1* | 7/2006 | Richter | G06F 17/30876 | 726/2 |
| 2008/0207128 A1* | 8/2008 | Mikko | G06F 9/445 | 455/41.2 |
| 2008/0254780 A1* | 10/2008 | Kuhl | G06F 9/5055 | 455/418 |
| 2009/0247077 A1* | 10/2009 | Sklovsky | G06F 9/445 | 455/41.1 |
| 2010/0227553 A1* | 9/2010 | Charrat | G06Q 20/341 | 455/41.1 |
| 2013/0040561 A1 | 2/2013 | Conde E Silva et al. | 455/41.1 | |
| 2013/0052949 A1* | 2/2013 | Yang | H04W 4/001 | 455/41.1 |
| 2013/0237153 A1* | 9/2013 | Ryu | H04B 5/0043 | 455/41.1 |
| 2013/0247117 A1* | 9/2013 | Yamada | G08C 17/02 | 725/93 |
| 2013/0256403 A1* | 10/2013 | MacKinnon Keith | G06K 5/00 | 235/375 |
| 2013/0305218 A1* | 11/2013 | Hirsch | G06F 8/36 | 717/106 |
| 2014/0009268 A1* | 1/2014 | Oshima | G08C 17/02 | 340/12.5 |
| 2014/0066093 A1* | 3/2014 | Yoo | G01S 5/0072 | 455/456.1 |
| 2014/0068518 A1* | 3/2014 | Liu | G06F 9/4443 | 715/835 |
| 2014/0176306 A1* | 6/2014 | Lee | G06K 7/10237 | 340/10.1 |
| 2014/0189808 A1* | 7/2014 | Mahaffey | H04L 63/0853 | 726/4 |
| 2014/0254466 A1* | 9/2014 | Wurster | H04L 12/189 | 370/312 |
| 2015/0082239 A1* | 3/2015 | Zhao | H04L 67/2823 | 715/788 |

FOREIGN PATENT DOCUMENTS

| | | | |
|---|---|---|---|
| EP | 2 563 046 A1 | 2/2013 | H04W 4/00 |
| JP | 2012-138074 A | 7/2012 | |

* cited by examiner

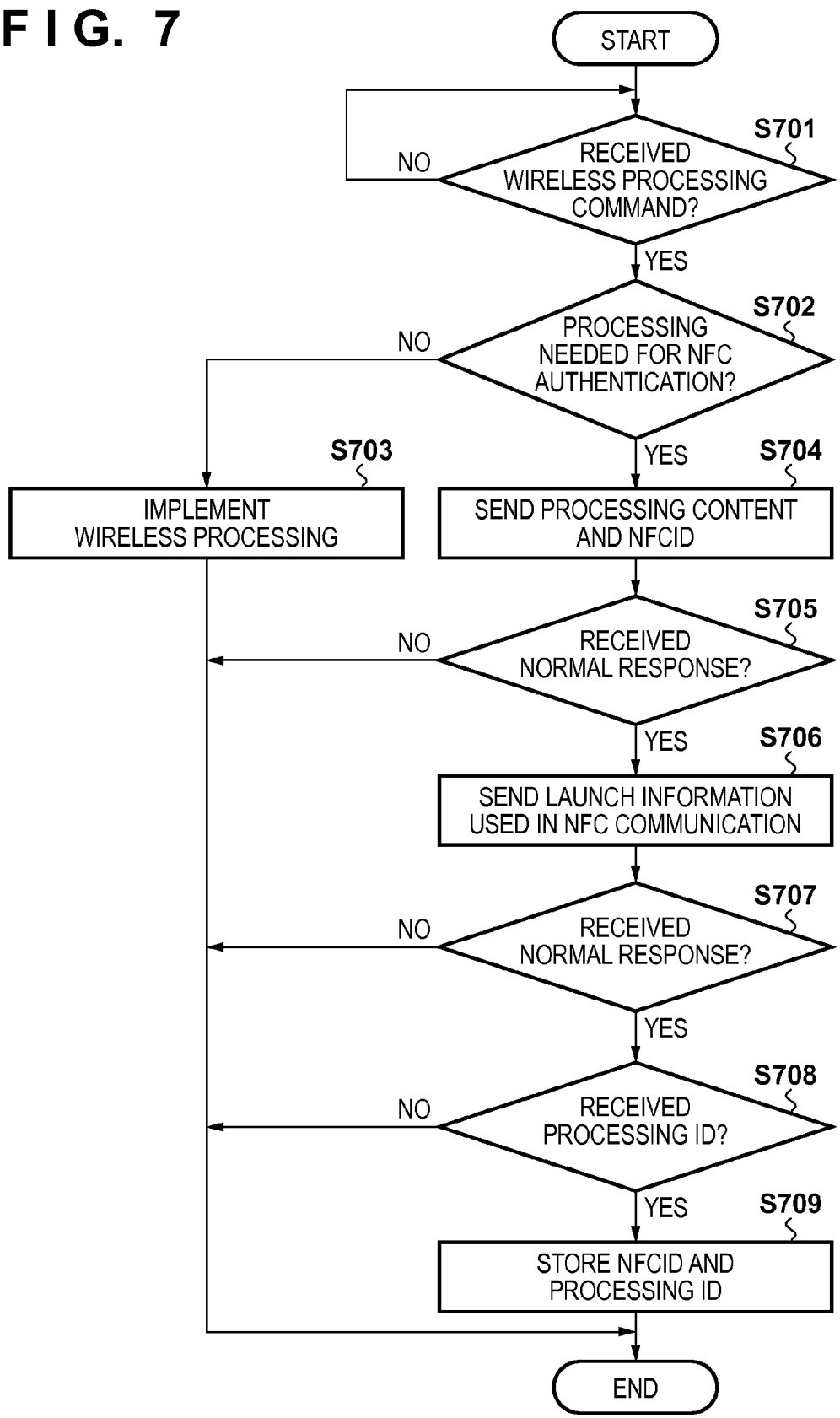
F I G. 7

COMMUNICATION APPARATUS, INFORMATION PROCESSING APPARATUS, AND CONTROL METHOD FOR THE SAME

BACKGROUND OF THE INVENTION

1. Field of the Invention

The present invention relates to a communication apparatus, an information processing apparatus, and a control method for the same, and in particular relates to a communication apparatus, an information processing apparatus, and a control method for the same, according to which multiple types of wireless communication are possible.

2. Description of the Related Art

In recent years, various communication interfaces have been mounted in mobile terminals such as mobile phones and smartphones. Examples of wireless communication interfaces include wireless LANs (Local Area Networks) and the like which can be used over a relatively wide range, and NFC (Near Field Communication) and the like which has a short communication distance. Different communication interfaces can be used according to their respective communication properties. For example, communication can be performed using a wireless LAN interface in the case of accessing a server on a network, and communication can be performed using an NFC interface in the case of communicating with a processing terminal installed at a specific location.

As an example in which multiple communication methods with different properties such as those described above are used in combination with each other, Japanese Patent Laid-Open No. 2012-138074 discloses a system that executes printing processing for document data using a wireless LAN and near field communication. After the document data is uploaded to a server from a mobile terminal by a user using a wireless LAN, the system causes the mobile terminal and a processing terminal (multifunction printer) installed at a specific location to perform near field communication based on the multifunction printer, whereupon the multifunction printer executes printing processing of the document data.

In the system disclosed in Japanese Patent Laid-Open No. 2012-138074, a device identifier for the mobile terminal is sent from the mobile terminal to the multifunction printer when near field communication is performed. The multifunction printer uses the device identifier to perform authentication of the mobile terminal and processing for acquiring the document data with the server, and remote printing of document data uploaded by the mobile terminal to the server is realized.

If a predetermined function is thus realized using multiple types of communication methods, it is necessary to launch a specific application to perform the processing that is to be executed using the communication methods. For example, there are cases in which the mobile terminal uses a specific application to perform processing for sending an order to the server and it is desired that payment processing therefor is realized using near field communication. In this case, in order to realize payment processing between the mobile terminal and the processing terminal via near field communication, it is sometimes necessary to execute a specific application, such as an application used for order processing, or an application that performs payment processing. In such a case, after ordering, the mobile terminal is moved to the location at which a processing terminal is installed, and if the necessary application is not launched at this time, payment processing cannot be executed even if the mobile terminal is brought near the processing terminal.

SUMMARY OF THE INVENTION

The present invention has been made in consideration of the aforementioned problems, and realizes a technique according to which it is possible to launch and execute an appropriate application for realizing a function using multiple types of communication methods.

In order to solve the aforementioned problems, the present invention provides a communication apparatus comprising: a first communication unit; a second communication unit that is different from the first communication unit; and a control unit configured to control processing in which the first and second communication units are used, wherein the control unit performs control such that information regarding an application needed for processing performed using the second communication unit is sent to a first apparatus using the first communication unit, a signal based on the information regarding the application is received from the first apparatus or a second apparatus connected with the first apparatus using the second communication unit and the application is launched in accordance with the signal, and processing performed using the second communication unit is executed using the launched application.

In order to solve the aforementioned problems, the present invention provides a control method for a communication apparatus, the communication apparatus comprising a first communication unit, a second communication unit that is different from the first communication unit, and a control unit configured to control processing in which the first and the second communication units are used, the control method comprising: a sending step of sending information regarding an application needed for processing performed using the second communication unit to a first apparatus using the first communication unit; a launching step of receiving a signal based on the information regarding the application from the first apparatus or a second apparatus connected with the first apparatus using the second communication unit and launching the application in accordance with the signal; and an execution step of executing, using the launched application, processing performed using the second communication unit.

In order to solve the aforementioned problems, the present invention provides an information processing apparatus comprising: a reception unit configured to receive information including identification information for a communication apparatus and application information sent by the communication apparatus; a determination unit configured to determine whether or not the communication apparatus exists within a communicable range based on the identification information, and a sending unit configured to, if it is determined by the determination unit that the communication apparatus exists within the communicable range, send the application information to the communication apparatus.

In order to solve the aforementioned problems, the present invention provides a control method for an information processing apparatus comprising: a reception step of receiving information including identification information for a communication apparatus and application information sent by the communication apparatus; a determination step of determining whether or not the communication apparatus exists within a communicable range based on the identification information; and a sending step of sending the application information to the communication apparatus if it is determined in the determination step that the communication apparatus exists within the communicable range.

According to the present invention, it is possible to launch and execute an appropriate application that realizes a function using multiple types of communication methods.

Further features of the present invention will become apparent from the following description of exemplary embodiments with reference to the attached drawings.

BRIEF DESCRIPTION OF THE DRAWINGS

FIG. 7 is a diagram showing an example of wireless communication processing for a mobile phone according to the embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Hereinafter, a mobile phone including wireless LAN and NFC communication functions will be described as an example of a communication apparatus to which the present invention can be applied. Also, a reader/writer including LAN and NFC communication functions will be described as an example of an information processing apparatus to which the present invention can be applied. However, the present invention can be applied to any electronic device including multiple communication interfaces. Examples of electronic devices in this context include game devices, tablet terminals, personal computers, and the like, but these are merely examples.

1. System Configuration

Figure 1:
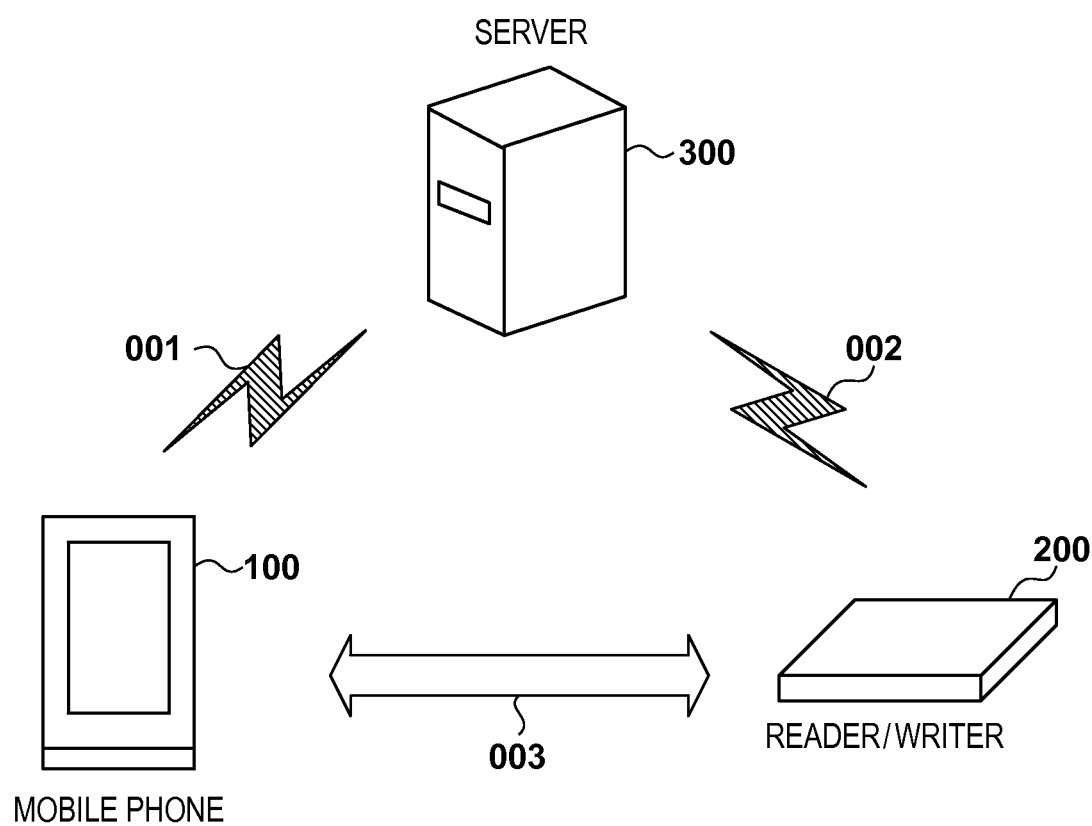
FIG. 1 is a diagram showing an example of a system according to an embodiment.

An example of a system according to the present embodiment will be described below with reference to FIG. 1. The communication system according to the present embodiment is constituted by a mobile phone 100, a reader/writer 200, and a server 300. The mobile phone 100 can establish wireless communication 001, such as a wireless LAN, and near field communication 003, such as NFC, and perform communication via these communication methods. Also, the reader/writer 200 can establish wireless and wired communication 002, such as a wireless LAN and a wired LAN, and near field communication 003 such as NFC, and perform communication via these communication methods. The server 300 can communicate via wireless communication 001 such as a wireless LAN, and the communication 002, which includes wireless communication such as a wireless LAN and wired communication such as a wired LAN.

By communicating with the server 300 using the wireless communication 001, the mobile phone 100 can access the server 300 and send and receive predetermined data. For example, if the user launches an application of the mobile phone 100 and orders a certain article, the mobile phone 100 accesses the server 300 and sends an order request. Information sent to the server 300 includes information regarding the application launched in the mobile phone 100 when connected to the reader/writer 200, a unique identifier, and process content, although this will be described in detail later. In response to the received request, the server 300 sends a response including the necessary data to the mobile phone 100.

The reader/writer 200 and the server 300 can communicate using the communication 002, which is wireless communication or wired communication. The server 300 stores the data received from the mobile phone 100 and the reader/writer 200 in internal storage and responds by reading out the stored data according to various inquiries. The server 300 sends data corresponding to the above-described order received from the mobile phone 100 to the reader/writer 200.

The mobile phone 100 can send and receive data that is needed for processing via the reader/writer 200 and near field communication 003, such as the NFC. With the mobile phone 100, upon authentication being performed with the reader/writer 200, the application designated in advance during ordering is launched automatically without a user operation, and processing of the data exchanged with the reader/writer 200 is executed. Accordingly, a predetermined function is realized between the mobile phone 100 and the reader/writer 200. For example, the user goes to a store, which is the ordering location at which the reader/writer 200 is located, to obtain an article, and the near field communication 003 is used to perform authentication of the fact that the mobile phone was used to make the order. Also, after authentication, the mobile phone 100 can use the launched application to perform payment processing for the ordered item. Thus, by launching the application designated in advance during ordering, it is possible to execute a predetermined function with the mobile phone 100 and the reader/writer 200 even if the application has not been launched in advance.

2. Configuration of Mobile Phone 100.

Figure 2:
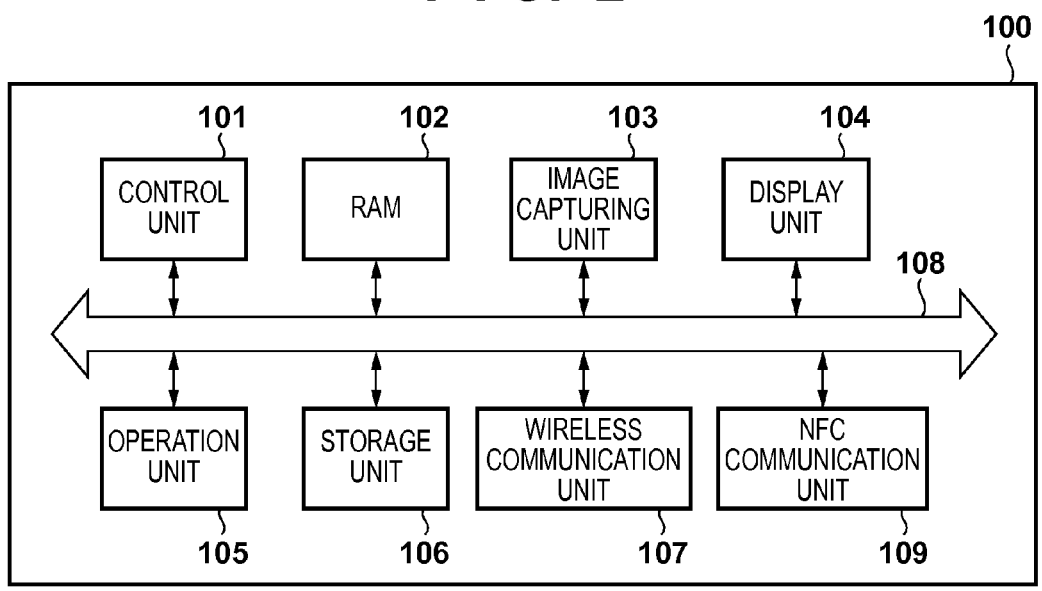
FIG. 2 is a block diagram showing a functional configuration of a mobile phone serving as an example of a mobile terminal according to the embodiment.

FIG. 2 is a block diagram showing a functional configuration of a mobile phone serving as an example of a mobile terminal according to the present embodiment.

A control unit 101 is a programmable processor such as a CPU or an MPU that, by executing a program stored in non-volatile memory, controls the functional blocks of the mobile phone 100 and realizes the function of the mobile phone. A RAM 102 is memory used mainly as a work area for the control unit 101 and a temporary buffer region for data. An OS (Operating System) and programs such as an application are expanded to the RAM 102 and executed by the control unit 101. The application launches and ends according to instructions from the OS and performs processing for realizing a predetermined function by accessing data received by an NFC communication unit 109 and the like via various APIs (Application Programming Interfaces) provided by the OS. Similarly, the application can use the various APIs provided by the OS to send data via the NFC communication unit 109 and write data in a storage unit 106. The control unit 101 causes the application for payment to be executed and realizes the payment processing with the reader/writer 200, for example. When the payment processing by means of the application for payment ends, the control unit 101 may perform control so that another application for displaying a balance or managing a household account is launched. An internal bus 108 is a bus for connecting the processing blocks in the mobile phone 100 to one another.

An image capturing unit 103 is a processing block that includes an optical lens, a CMOS sensor, a digital image processing unit, and the like, and acquires a captured image by converting an analog signal input via the optical lens into digital data. The captured image acquired by the image capturing unit 103 is temporarily stored in the RAM 102 and is processed based on control performed by the control unit 101. For example, this processing includes being stored in a storage medium by the storage unit 106, being sent to an external device by a wireless communication unit 107, and the like. Also, the image capturing unit 103 includes a lens control unit as well, and performs control of zooming, focusing, diaphragm adjustment, and the like based on instructions from the control unit 101.

A display unit 104 is constituted by a liquid crystal panel, an organic EL panel, or the like, and performs display of an operation screen, a captured image, or the like based on instructions from the control unit 101. According to instructions from the control unit 101, the display unit displays information regarding an ordering service, the information having been received from the server 300 via the wireless communication unit 107, which will be described later. An operation unit 105 is constituted by buttons, a numeric pad, a touch panel, a remote control, or the like, and receives operation instructions from a user. The operation unit 105 receives user instructions with respect to information regarding the ordering service displayed by the display unit 104. The operation information input from the operation unit 105 is sent to the control unit 101, and the control unit 101 sends predetermined information to the server 300 via the wireless communication unit 107 based on the operation information.

The storage unit 106 is constituted by a high-capacity storage medium and writes and reads out various kinds of data in and from the storage medium based on instructions from the control unit 101. The storage medium is constituted by a built-in flash memory, a built-in hard disk, a removable memory card, or the like.

The wireless communication unit 107 is a processing block that includes processing hardware and the like for performing communication by means of a wireless LAN or the like and performs wireless LAN communication using an IEEE 802.11n/a/g/b method, for example. The wireless communication unit 107 is connected to an external access point by a wireless LAN and communicates with the server 300 via the access point.

The NFC communication unit 109 includes hardware for performing communication with a short communication distance, such as NFC. The NFC communication unit 109 is constituted by an antenna or the like, and has communication functions for various modes, namely an NFC reader/writer mode, initiator and target for Peer mode, and a card emulation mode. In the case of the NFC reader/writer mode, or the initiator for the Peer mode, near field communication is performed without contact between the antenna and NFC tags or the like by outputting an RF signal from the antenna, and data is written and read out in and from the memory built into the NFC tags. In the case of the target for the NFC Peer mode or the card emulation mode, a modulated RF signal is received from the antenna and stored in the RAM 102. The NFC communication unit 109 sends the response signal by performing load modulation on the received RF signal. The NFC communication unit 109 sends and receives data according to a format described by a later-described NDEF (NFC Data Exchange Format) when performing near field communication with the reader/writer 200. The NFC communication unit 109 receives commands such as requests for processing IDs and information such as the later-described application launch information from the reader/writer 200, and sends the received data to the control unit 101.

3. Configuration of Reader/Writer 200.

Figure 3:
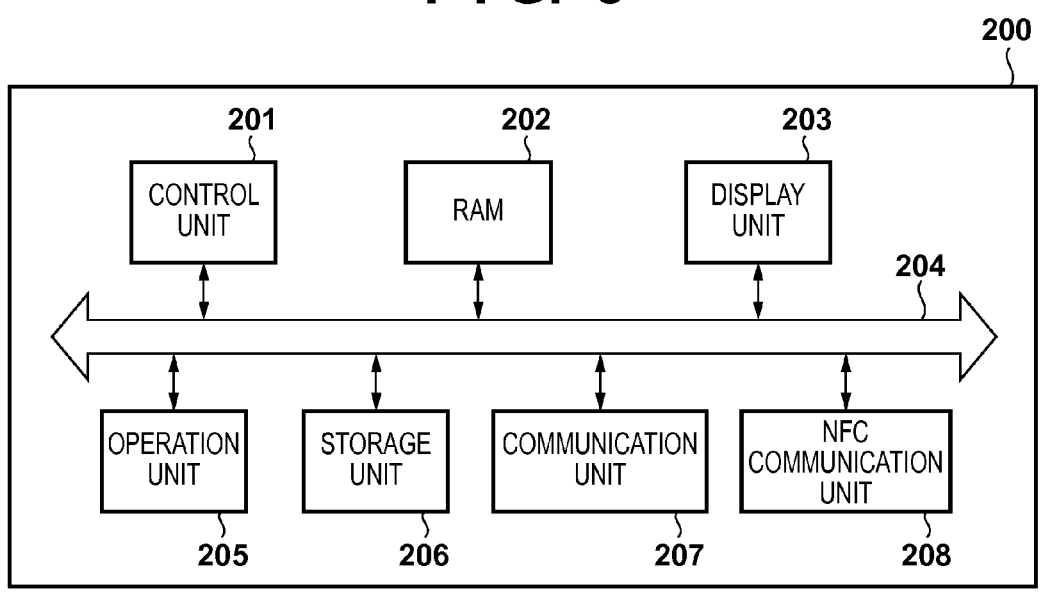
FIG. 3 is a block diagram showing a functional configuration of a reader/writer terminal serving as an example of an information processing terminal according to the embodiment.

Next, the functional configuration of the reader/writer 200 according to the present embodiment will be described with reference to FIG. 3. A control unit 201 is a programmable processor such as a CPU or an MPU that, by executing a program stored on a non-volatile memory, controls the functional blocks of the reader/writer 200 and realizes the function of the reader/writer. A RAM 202 is memory used mainly as a work area for the control unit 201 and a temporary buffer region for data.

A display unit 203 is constituted by a liquid crystal panel, an organic EL panel, or the like, and performs display of an operation screen or the like based on instructions from the control unit 201. The state of connection to the mobile phone 100 by means of an NFC communication unit 208, or authentication results may be displayed as needed. An internal bus 204 is a bus for connecting the processing blocks in the reader/writer 200 to one another. An operation unit 205 is constituted by buttons, a numeric pad, a touch panel, a remote control, or the like, and receives operation instructions from a user. The operation information input from the operation unit 205 is sent to the control unit 201, and the control unit 201 executes control of the processing blocks based on the operation information.

The storage unit 206 is constituted by a high-capacity storage medium and writes and reads out various kinds of data in and from the storage medium based on instructions from the control unit 201. The storage medium is constituted by a built-in flash memory, a built-in hard disk, a removable memory card, or the like. Various types of data received from the server 300 via the communication unit 207 are stored in the storage unit 206 according to instructions from the control unit 201 and are read out as needed according to instructions from the control unit 201.

The communication unit 207 includes hardware and the like for performing communication by means of a wireless LAN and a wired LAN. With the wireless LAN, the communication unit 207 is a processing block using an IEEE 802.11n/a/g/b method, for example. The communication unit 207 is connected to an external access point by a wireless LAN, and performs wireless LAN communication with another wireless communication device via the access point. Also, with the wired LAN, the communication unit 207 performs communication via an external router or a switching hub. The communication unit 207 receives data from the server 300 according to instructions from the control unit 201 and sends the received data to the control unit 201.

The NFC communication unit 208 is constituted by an antenna and a resonance circuit and has communication functions for the above-described modes. In addition to sending information such as the later-described application launch information to the mobile phone 100, the NFC communication unit 208 sends commands such as a processing ID request.

4. Configuration of Server 300

Figure 12:
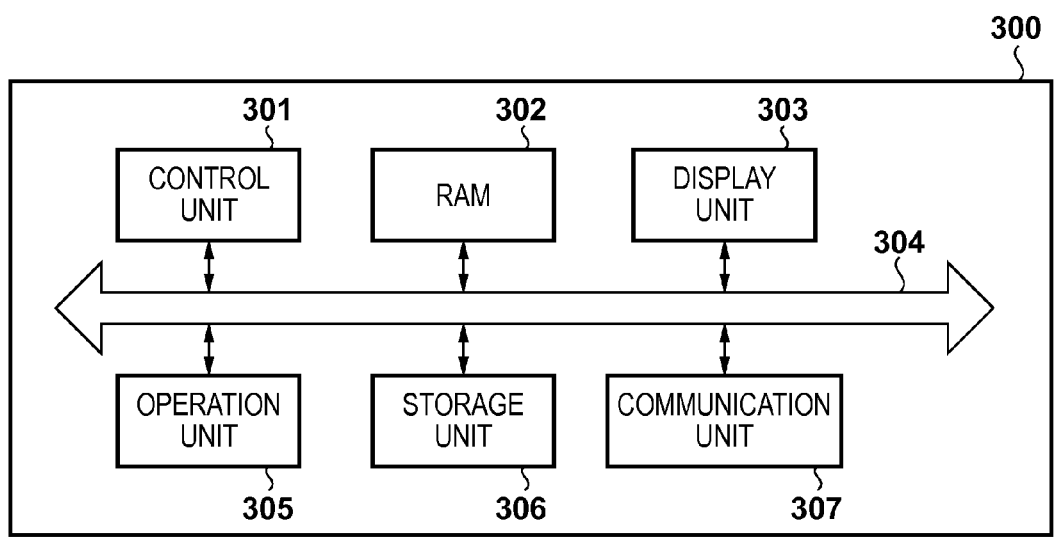
FIG. 12 is a block diagram showing a functional configuration serving as an example of a server according to the embodiment.

Furthermore, the functional configuration of the server 300 according to the present embodiment will be described with reference to FIG. 12. A control unit 301 is a programmable processor such as a CPU or an MPU that, by executing a program stored on a non-volatile memory, controls the functional blocks of the server 300 and realizes the function of the server. A RAM 302 is memory used mainly as a work area for the control unit 301 and a temporary buffer region for data.

The display unit 303 is constituted by a liquid crystal panel or the like, performs display of an operation screen or the like based on instructions from the control unit 301, although this is not necessary, and may send display data to another device via the communication unit 307. An internal bus 304 is a bus for connecting the processing blocks in the server 300 to one another. The operation unit 305 receives an operation instruction from the user, although this is not necessary, and the control unit 301 may receive remote operation via the communication unit 307.

The storage unit 306 is constituted by a high-capacity storage medium and writes and reads out various kinds of data in and from the storage medium based on instructions from the control unit 301. The storage medium is constituted by a built-in flash memory, a built-in hard disk, a removable memory card, or the like. Various types of data received from the mobile phone 100 via the communication unit 307 are stored in the storage unit 306 according to instructions from the control unit 301 and are read out as needed according to instructions from the control unit 301.

The communication unit 307 may have a configuration similar to that of the communication unit 207 of the above-described reader/writer 200. The communication unit 307 receives data from the mobile phone 100 according to instructions from the control unit 301 and sends the received data to the control unit 301. Also, data received from the mobile phone 100 is sent to the reader/writer 200 according to instructions from the control unit 301.

5. Description of Application Executed by Mobile Phone 100

Figure 4:
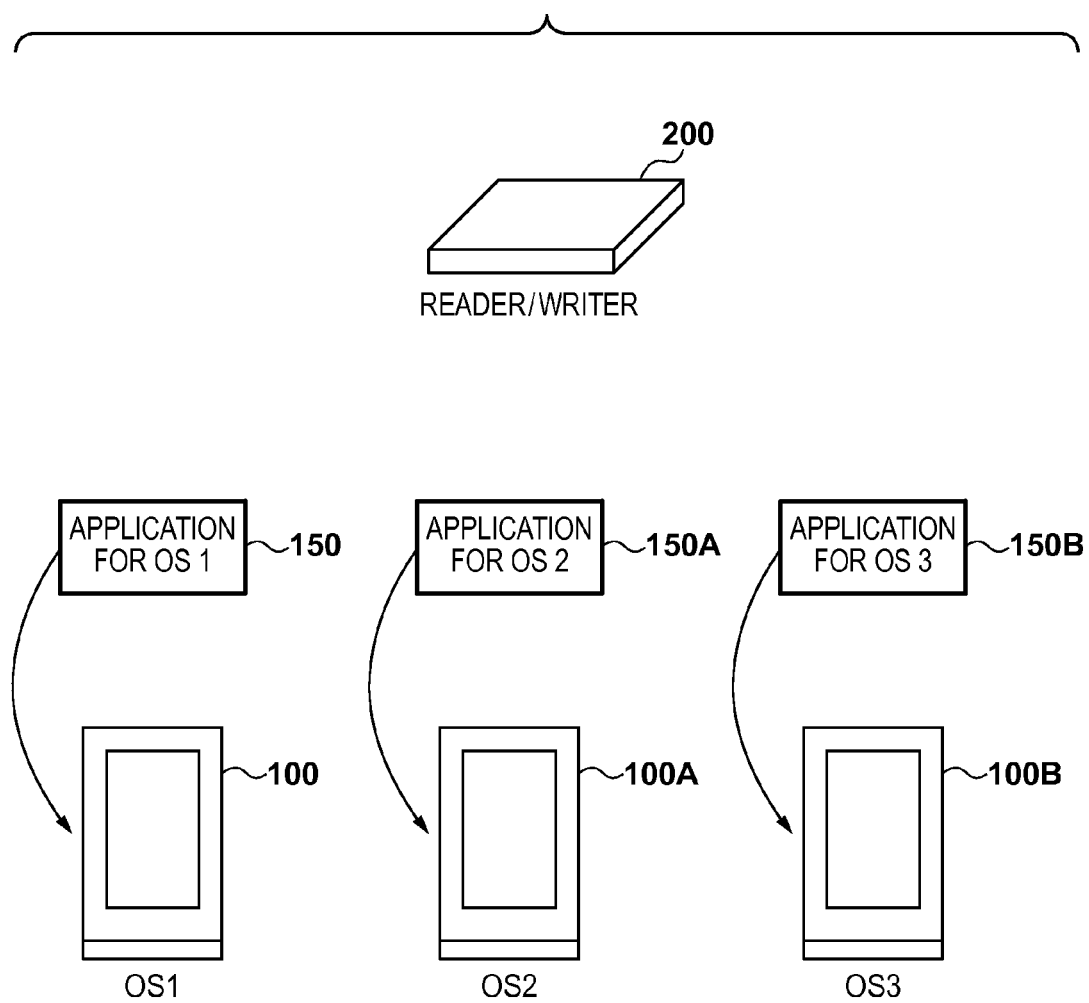
FIG. 4 is a diagram showing an example of applications for OSes according to the embodiment.

FIG. 4 shows OSes for mobile phones 100, 100A, and 100B, and a combination of applications that run on the OSes. An OS 1 is executed in the RAM 202 in the mobile phone 100, and only an application 150 corresponding to the OS 1 can be executed in the mobile phone 100 in which the OS 1 is executed. Similarly, an OS 2 is executed in the RAM in the mobile phone 100A, and only an application 150A for the OS 2 can be executed in the mobile phone 100A in which the OS 2 is executed. Similarly, in the mobile phone 100B as well, only the application 150B for the OS 3 can be executed. That is to say, the application 150 for the OS 1 cannot be launched on the OS 2 being run on the mobile phone 100A, nor can it be launched on the OS 3 being run on the mobile phone 100B. In order to launch applications on the OSes, applications that correspond to the OSes are needed. For example, the OS 1 is Windows (registered trademark) by the Microsoft Corporation, the OS 2 is Android OS (registered trademark), and the OS 3 is iOS (registered trademark) by the Apple Corporation, and applications corresponding to each OS are needed.

The mobile phones 100, 100A, and 100B have target functions, which are for receiving commands in the NFC card emulation mode or the Peer mode. With the above-described mode of the reader/writer 200, when notification of data is performed based on the initiator function, which is for sending commands, the mobile phone receives the data and launches the corresponding application.

6. Configuration of Data Sent from Mobile Phone 100

Next, an example of a configuration of communication data including device identification information according to the present embodiment will be described with reference to FIG. 5. The communication data defined by the format is sent to the server 300 via the wireless communication unit 107 by the mobile phone 100, and is subsequently sent from the server 300 to the reader/writer 200. From the received data, the server 300 reads out NFCID, process content, and launch information as will be described later and executes server processing. Also, the server 300 uses the present format to store the processing ID, process content, NFCID, and launch information, which are sent to the reader/writer 200.

The format of the communication data is such that it is constituted by a length 501, a command 502, a destination 503, an NFCID 504, a device identification ID 505, a processing ID 506, a manufacturer ID 507, process content 508, and a Payload 509. The length 501 indicates the overall length of the communication data. The command 502 defines the command type of the communication data. The destination 503 stores address information indicating the communication apparatus to which the communication data is addressed. The NFCID 504 is further constituted by the device identification ID 505, the processing ID 506, and the manufacturer ID 507. The device identification ID indicates ID information for identifying the mobile phone 100, and it may be a randomly-generated number, and it may be unique identification information. The processing ID 506 is identification information for identifying a process. The manufacturer ID 507 indicates a unique identifier for identifying the manufacturer of the mobile phone 100. The process content 508 is the processing designated by the user in the application executed by the mobile phone 100, and is order processing, for example. In the present embodiment, processing relating to the process content is executed in the reader/writer 200. The payload 509 is used for storing data to be sent to a sending destination, and stores application launch information, which will be described later with reference to FIG. 6. Note that the format of the communication data is not limited to the above description, and another format may be used as long as the necessary information is included.

7. Configuration of Application Launch Information

An example of a configuration of the application launch information according to the present embodiment will be described below with reference to FIG. 6. The application launch information is stored in the payload 509 of the communication format shown in FIG. 5 above, and is sent by the mobile phone 100 to the reader/writer 200 via the server 300. The reader/writer 200 reads out the application launch information by referencing the payload 509 and sends it to the mobile phone 100 via the NFC communication unit 208.

The application launch information is defined using the format of the data received and sent using NFC. The data received and sent using NFC is defined as having an NDEF (NFC Data Exchange Format) by the NFC forum. The first two bytes of an NDEF file are defined as an NLEN field 600 and indicate the NDEF message length following the NLEN field.

The NDEF message is constituted by multiple NDEF records, as with NDEF records 601 to 604, for example. The NDEF records are each further constituted by an NDEF header, type, and payload. Note that E104h indicates an example of an initial address in which the NDEF records are stored. The NDEF header stores data such as a flag indicating the beginning or end of a message, payload length, and the like. For example, as shown in the NDEF record 601, the type of the NDEF record 601 stores an ASCII character string "OS1.com/LaunchApp", and thereby the corresponding OS information is designated. The payload of the NDEF record 601 stores an ASCII character string "CameraApp", and thereby the name of the application that is to be launched is designated. An ASCII character string indicating an application package "OS2.com:pkg" designates and defines the OS in the type of the NDEF record 602. The payload of the NDEF record 602 stores the ASCII character string "CameraApp Ver3" and indicates version information along with the name of the application to be launched. With the NDEF record 603 and the NDEF record 604, it is indicated that application version information different from that of the NDEF record 602 is stored in the payloads of the NDEF records.

Note that the types and payloads of the NDEF records described in the present embodiment are examples and the present invention is not limited thereto. For example, information regarding the service access point (SAP) defined by the NFC forum may be included in the type and payload of the NDEF record. See the "Logical Link Control Protocol Technical Specification" for more information about the SAP. Also, the launch information is expressed using an RTD format defined in the "NFC Record Type Definition (RTD) Technical Specification" defined by the NFC forum, but the present invention is not limited thereto. Information indicating a detailed application path may be furthermore included in the payload of the NDEF record. For example, the RTD record type is defined as "android.com:pkg", and the schema to the application that is to be launched may be defined as any record indicating the application path.

8. Operation of Mobile Phone 100 with Server 300

An example of wireless communication processing for the mobile phone 100 according to the present embodiment will be described below with reference to FIG. 7. The wireless communication is communication that is performed first among multiple communication processes, and is, for example, communication for accessing the server 300 on the Internet and ordering an article. The processing corresponding to the present flowchart is realized by a program stored in the storage unit 106 by the control unit 101 being expanded to the RAM 102 and executed in response to an instruction given by the user to the mobile phone 100 to execute the application.

In step S701, the control unit 101 determines whether or not a command (wireless processing command), for which communication using the wireless communication unit 107 serving as a first communication unit is needed, has been received. Here, the wireless processing command is input according to an ordering operation or the like performed via the operation unit 105 by the user with respect to the application. If a command for which communication with the server 300 is necessary has been input, the control unit 101 determines that the wireless processing command has been received.

If the wireless processing command has been received, the control unit 101 moves to the processing of step S702, and if the wireless processing command has not been received, the control unit 101 returns to the processing of step S701 and waits again for input of the wireless processing command.

In step S702, the control unit 101 determines whether or not the wireless processing command received in step S701 is a command for which processing (here, authentication processing is used as an example) using another communication unit (NFC communication unit 109 serving as a second communication unit) is necessary. For example, this determination can be performed by referencing a pre-set table in which wireless processing commands are associated with whether or not authentication by means of NFC is needed, or by analyzing the content of the wireless processing command. For example, if the application provides a service for receiving, at a store, an article ordered on a specific server 300 on the Internet, the command for performing ordering of the article with respect to the server 300 is a wireless processing command for which authentication using the NFC communication unit 109 at a store is necessary. If it is determined that the wireless processing command is a command for which authentication by means of the NFC communication unit 109 is necessary, the control unit 101 moves to the processing of step S704, and if it is determined that the wireless processing command is a command for which authentication by means of the NFC communication unit 109 is not necessary, the control unit 101 moves to the processing of step S703.

In step S703, the control unit 101 performs the predetermined wireless communication processing and ends the present flowchart. Examples of commands for which authentication using the NFC communication unit 109 is not necessary include commands requesting display data to the server 300.

Figure 5:
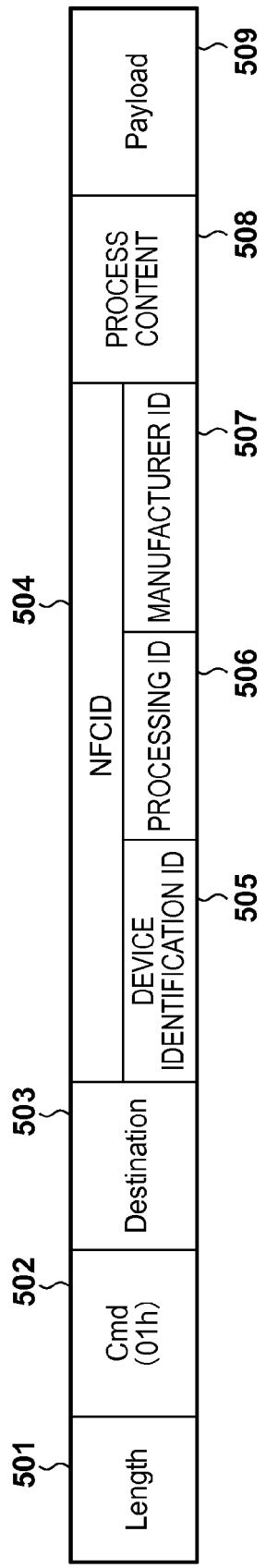
FIG. 5 is a diagram showing an example of a data configuration including device identification information according to the embodiment.
Figure 6:
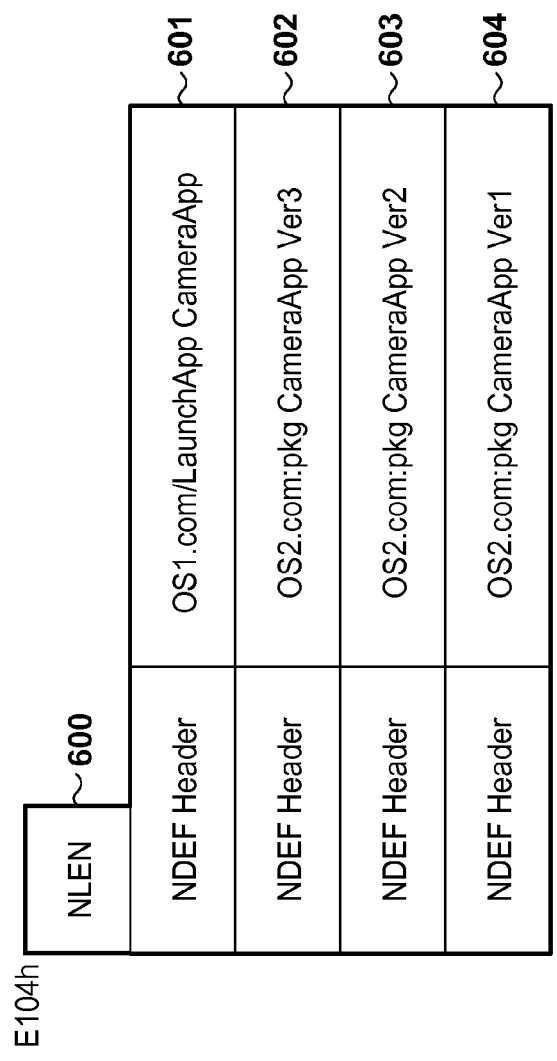
FIG. 6 is a diagram showing an example of application launch information according to the embodiment.

In step S704, the control unit 101 sends data including the NFCID 504 and the process content 508 shown in FIG. 5 to the server 300 via the wireless communication unit 107 and moves to the processing of step S705. Here, information specifying the ordered article, the number ordered, and the like may be included in the process content 508.

In step S705, if the response signal received from the server 300 via the wireless communication unit 107 indicates a normal state, the control unit 101 moves to the processing of step S706, and if the response signal indicates an abnormal state or if the response signal cannot be received within a predetermined amount of time, the control unit 101 stops the continuation of processing and ends the processing.

In step S706, the control unit 101 sends, to the server 300, launch information for an application that needs to be launched by the mobile phone 100 at the time of processing using the NFC communication unit 109, which is to be performed at a later time. Thus, by sending the NFCID, the process content, and the launch information for the application that needs to be launched, it is possible to automatically launch an application needed for processing that is to be performed using communication by means of the NFC communication unit 109. The control unit 101 uses the pre-set information for the application that is to be launched to generate launch information having the format described with reference to FIG. 6, sends the data stored in the payload 509 shown in FIG. 5 to the server 300 via the wireless communication unit 107, and moves to the processing of step S707.

In step S707, if the response signal received from the server 300 via the wireless communication unit 107 indicates a normal state, the control unit 101 moves to the processing of step S708, and if the response signal indicates an abnormal state or if the response signal cannot be received within a predetermined amount of time, the control unit 101 stops the continuation of processing and ends the processing.

In step S708, the control unit 101 determines whether or not the processing ID is included in the response signal received in step S707. If it is confirmed that the processing ID is included in the received response signal and has an identifier in accordance with a predetermined description format for example, the control unit 101 moves to the processing of step S709, and in other cases, the control unit 101 determines that the processing ID was not received, and the processing ends.

In step S709, the control unit 101 stores the NFCID and the processing ID in association with each other in the storage unit 106 and the processing of the present flowchart ends. Note that starting with the processing shown in FIG. 7, the specific processing using NFC is realized by the control unit 101 executing an application that runs on the OS. Accordingly, the application needs to be running in order to use the NFCID and the processing ID stored in the storage unit 106 in step S709. However, there is a difference in the amount of time in the period from when the processing of FIG. 7 is performed until when the processing using the NFCID and the processing ID, or more specifically, until when the processing using the NFC communication unit 109 is performed, and therefore there is a possibility that the application will end during that period. In view of this, in the present embodiment, the launch information and the NFCID are sent to the server 300 and are transferred from the server 300 to the reader/writer 200. Then, after authentication processing is performed using the NFC communication unit 109, the launch information is acquired from the reader/writer 200, and after the application of the type based on the launch information is launched, it is possible to continue the processing using the processing ID stored in the storage unit 106. Hereinafter, operations of the server 300 and the reader/writer 200 for realizing this kind of processing will be described.

9. Operation of Server 300 with Mobile Phone 100

Figure 8:
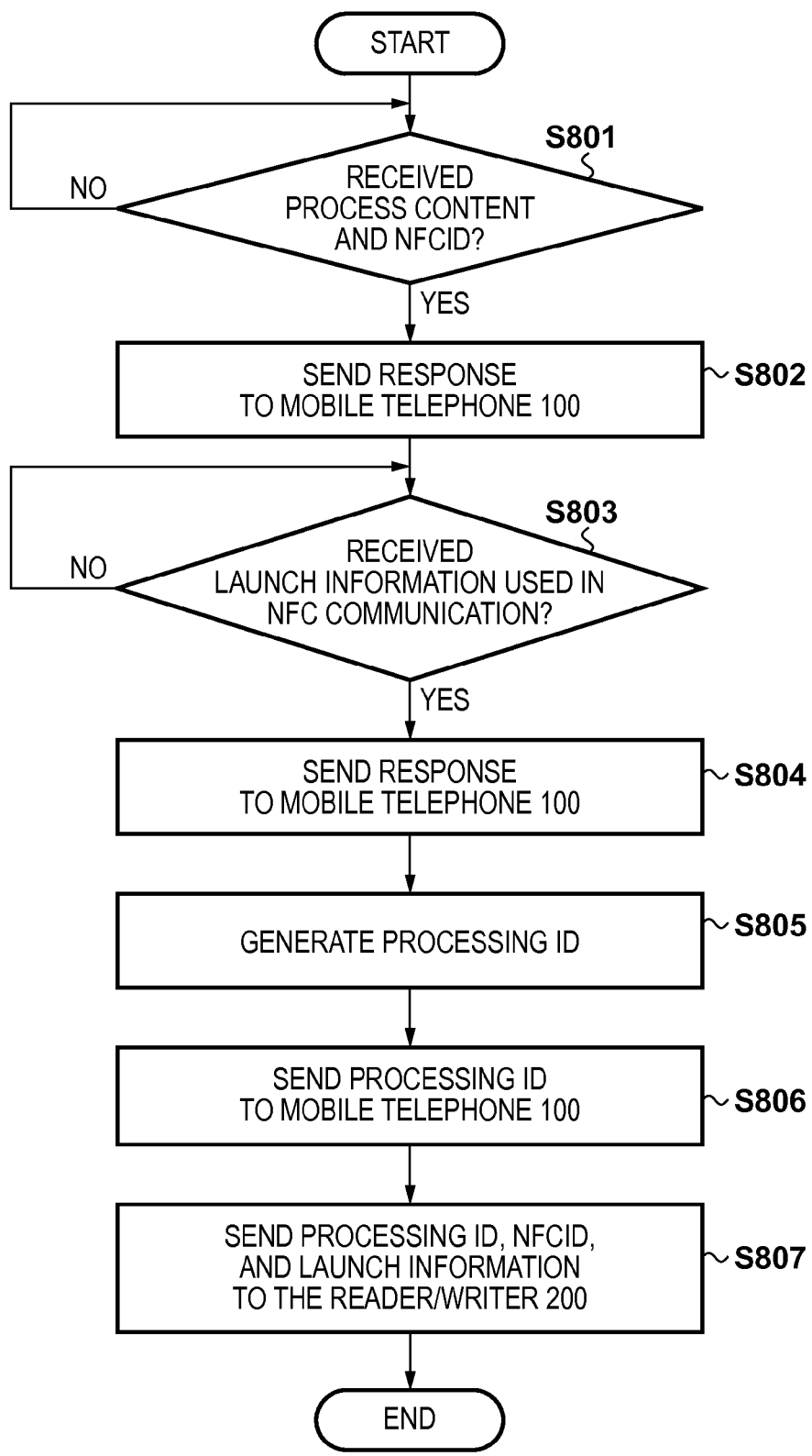
FIG. 8 is a diagram showing an example of processing for a server according to the embodiment.

An example of processing for the server 300 according to the present embodiment will be described below with reference to FIG. 8. The series of processes shown in FIG. 8 are processes of the server 300 that correspond to the processes of the mobile phone 100 described with reference to FIG. 7. That is to say, they are a series of processes of the server 300 during communication that is first performed by the mobile phone 100 for realizing a service provided by the application. The processing corresponding to the present flowchart is realized by a program stored in the storage unit 306 being expanded to the RAM 302 and executed by the control unit 301 when the server 300 has been launched. The present processing is started when, for example, the control unit 301 has launched the server application and is waiting for reception of the data sent from the mobile phone 100.

In step S801, the control unit 301 determines whether or not the process content and the NFCID sent from the mobile phone 100 have been received. The control unit 301 references the process content and the NFCID from the received data based on the format shown in FIG. 5, and if they have been written in accordance with the predetermined format, the control unit 301 determines that the process content and the NFCID have been received and moves to the processing of step S802. If it is determined that the process content and the NFCID have not been received, the control unit 301 continues the processing of step S801. In step S802, the control unit 301 sends a response to the effect that the above-described process content and NFCID have been received to the mobile phone 100 and moves to the processing of step S803.

In step S803, the control unit 301 determines whether or not the application launch information sent from the mobile phone 100 has been received. The control unit 301 references the launch information based on the format shown in FIG. 6 from the received data, and if it has been written in accordance with the predetermined format, the control unit 301 determines that the launch information has been received and moves to the processing of step S804. If it is determined that the application launch information has not been received, the control unit 301 continues the processing of step S803. In step S804, the control unit 301 sends a response to the effect that the launch information has been received to the mobile phone 100 and moves to the processing of step S805.

In step S805, the control unit 301 generates the processing ID. The control unit 301 generates an identifiable processing ID in association with the NFCID and process content received in step S801 and the application launch information received in step S803 and moves to the processing of step S806. The processing ID is an identifier in accordance with the predetermined description format and may be any kind of number as long as the associated data can be uniquely specified, and for example, it may be a number that sequentially increases by 1, starting from a predetermined value. In step S806, the control unit 301 sends the processing ID generated in step S805 to the mobile phone 100. Thereafter, the control unit 301 moves to the processing of step S807.

In step S807, the control unit 301 sends the process content, NFCID, and application launch information received in steps S801 and S803, and the processing ID generated in step S805 to the reader/writer 200 that is appropriate according to the process content. The server 300 may specify the reader/writer 200 by, for example, referencing the process content and reading out a table recorded in advance in the reader/writer 200 corresponding to the process content. Upon ending the processing of step S807, the control unit 301 ends the processing of the present flowchart.

10. Processing of Reader/Writer 200 with Server 300

Figure 9:
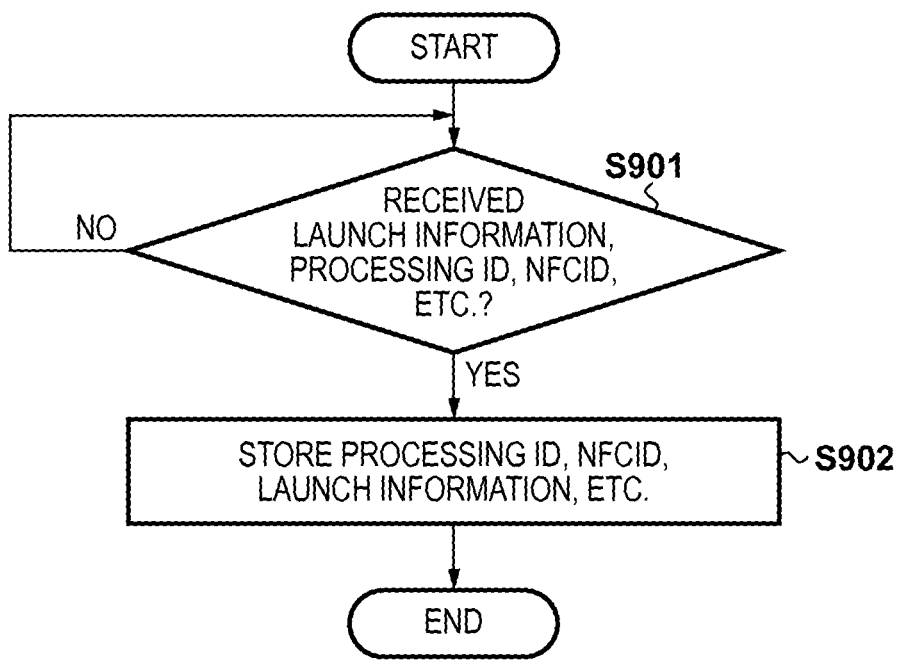
FIG. 9 is a diagram showing an example of wireless communication processing for a reader/writer according to the embodiment.

An example of communication processing performed by the reader/writer 200 with the server 300 according to the present embodiment will be described below with reference to FIG. 9. The present processing is for enabling sending of the launch information from the reader/writer 200 when information such as the launch information sent from the mobile phone 100 to the server 300 has been accumulated in the reader/writer 200 and thereafter near field communication is to be performed between the mobile phone 100 and the reader/writer 200. The processing corresponding to the present flowchart is realized by a program stored in the storage unit 206 being expanded to the RAM 202 and executed by the control unit 201 when the power source of the reader/writer 200 is on. The present processing is started in a state of waiting for the reception of data sent from the server 300.

In step S901, the control unit 201 serving as a reception unit determines whether or not a request to acquire the process content, NFCID, application launch information, and processing ID has been received from the server 300 via the communication unit 207. If it is determined that the process content, NFCID, application launch information, and processing ID have been received in the aforementioned predetermined format, the control unit 201 moves to the processing of step S902. On the other hand, if it is determined that the above data has not been received, the control unit 201 continues the processing of step S901.

In step S902, the control unit 201 stores the process content, NFCID application launch information, and processing ID that were received in step S901 in the storage unit 206. The stored data is read out when communication with the mobile phone 100 is performed using later-described near field communication, and the stored data is used for authentication of the mobile phone 100 and confirmation of the processing ID of the mobile phone. Thereafter, the control unit 201 ends the processing of the present flowchart.

11. Processing of Reader/Writer 200 with Mobile Phone 100

Figure 10:
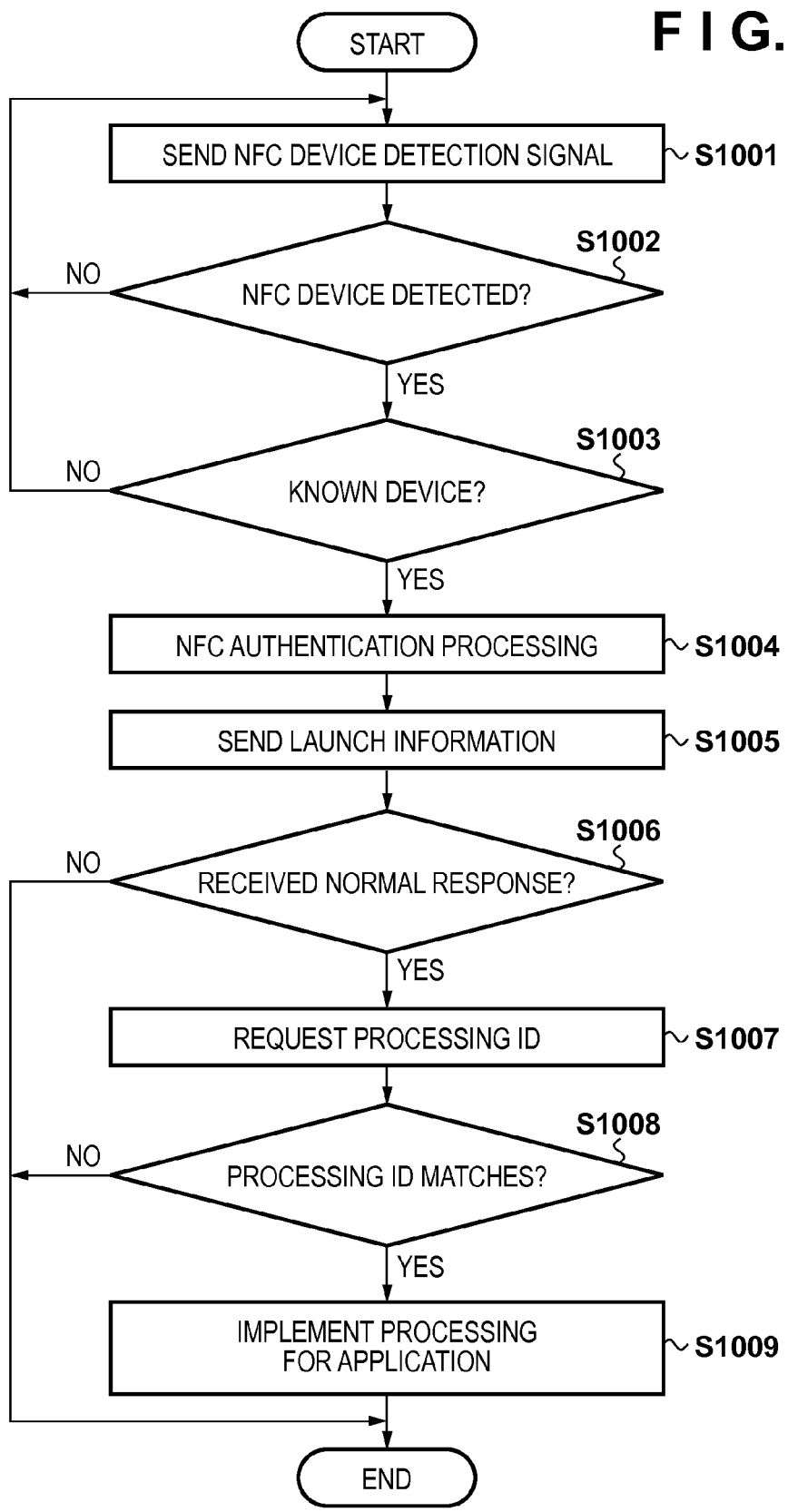
FIG. 10 is a diagram showing an example of processing performed by a reader/writer with a mobile phone using near field communication according to the embodiment.

Next, an example of processing performed by the reader/writer 200 with the mobile phone 100 using near field communication according to the present embodiment will be described with reference to FIG. 10. The present near field communication is second communication performed by the mobile phone 100 for realizing the service provided by the application of the present embodiment. According to the processing of the present flowchart, the reader/writer 200 can launch the application that is to be launched with respect to the appropriate mobile phone 100 that was authenticated, and execute a desired function with the mobile phone 100. Similarly to the series of processes of the reader/writer 200 described with reference to FIG. 8, the processing of the present flowchart is executed by the control unit 201 executing a program expanded to the RAM 202. Also, the processing of the present flowchart starts when the user, after having ordered using the mobile phone 100, brings the mobile phone 100 near to the reader/writer 200. The processing may be performed in parallel with the flowchart shown in FIG. 9, although this is based on the premise that the application launch information and the like that was described with reference to FIG. 9 has been stored in the storage unit 206 of the reader/writer 200.

In step S1001, the control unit 201 serving as a determination unit sends a predetermined device detection signal determined for use in NFC in order to detect the mobile phone 100. In step S1002, the control unit 201 determines whether or not the mobile phone 100 that has the NFC function and exists within a communicable range has been detected by the NFC communication unit 208. The detection of the mobile phone 100 is determined according to whether or not the response from the mobile phone 100 to the predetermined device detection signal has been received. If the response to the device detection command from the mobile phone 100 has been received, the control unit 201 moves to the processing of step S1003. If it is determined that the mobile phone 100 has not been detected, the processing returns to step S1001 and detection of a device having the NFC function is continued.

In step S1003, the control unit 201 determines whether or not the mobile phone 100 is a known device. That is to say, using the processing of the present step and step S1005, it is possible to specify the mobile phone that is to execute the predetermined function with the reader/writer 200. The determination of whether or not the mobile phone 100 is a known device is determined based on whether or not the NFCID is known. If an NFCID that matches the NFCID of the mobile phone 100 has been stored in the storage unit 206, the control unit 201 determines that the NFCID of the mobile phone 100 is a known ID and moves to the processing of step S1004. If the NFCID of the mobile phone 100 is not a known ID, the control unit 201 returns to the processing of step S1001. In step S1004, the control unit 201 performs predetermined device authentication processing determined by the mobile phone 100 and NFC via the NFC communication unit 208 and moves to the processing of step S1005.

In step S1005, among the information received from the server 300 and accumulated in the storage unit 206, the control unit 201 serving as a sending unit sends the launch information associated with the NFCID of the authenticated mobile phone 100 to the mobile phone 100 via the NFC communication unit 208. The mobile phone 100 can launch the application by receiving the launch information, and the remaining data that is exchanged with the reader/writer 200 can be processed by the application. Thereafter, the control unit 201 moves to the processing of step S1006.

In step S1006, if the response signal received from the mobile phone 100 via the NFC communication unit 208 is normal, the control unit 201 moves to the processing of step S1007. On the other hand, if the response signal is abnormal, or if the response signal cannot be received within the predetermined amount of time, continuation of the processing is stopped, and the processing ends.

In step S1007, the control unit 201 sends a signal requesting the processing ID to the mobile phone 100 via the NFC communication unit 208 and moves to the processing of step S1008. The application launched on the mobile phone 100 responds to the request by reading out the processing ID from the storage unit 106.

In step S1008, if the received processing ID and the processing ID stored in the storage unit 206 match, the control unit 201 moves to the processing of step S1009. If the processing ID cannot be received from the mobile phone 100 in the predetermined amount of time, or if the received processing ID does not match the processing ID stored in the storage unit 206, the control unit 201 ends the processing of the present flowchart.

In step S1009, the control unit 201 serving as an execution unit executes the process content corresponding to the processing ID while communicating with the mobile phone 100 as needed. Here, payment processing with respect to the order written in the process content and delivery processing for the ordered article are executed and the processing in the present flowchart ends in step S1009.

12. Processing of Mobile Phone 100 with Reader/Writer 200

Figure 11:
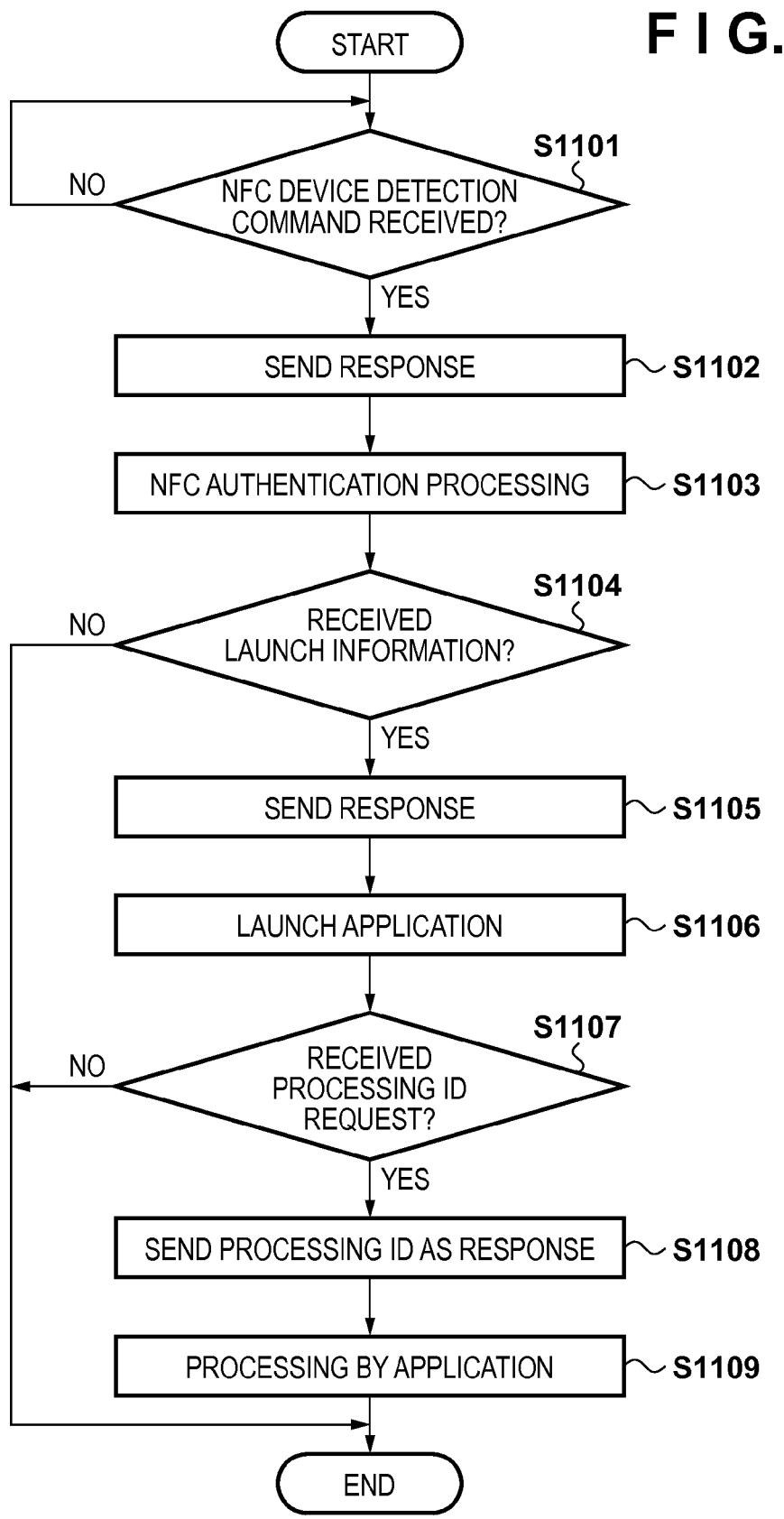
FIG. 11 is a diagram showing an example of processing using near field communication, performed by a mobile phone with a reader/writer according to the embodiment.

An example of processing using near field communication performed by the mobile phone 100 with the reader/writer 200 according to the present embodiment will be described below with reference to FIG. 11. Note that similarly to the series of processes for the mobile phone shown in FIG. 7, the processing corresponding to the present flowchart is executed by the control unit 101 by expanding a program stored in the storage unit 106 to the RAM 102.

In step S1101, the control unit 101 determines whether or not the device detection signal transmitted periodically from the reader/writer 200 has been received. If the device detection signal has been received, the control unit 101 moves to the processing of step S1102. If the device detection signal has not been received, the control unit 101 continues the reception processing in step S1101. In step S1102, the control unit 101 sends a response to the device detection signal to the reader/writer 200 via the NFC communication unit 109 and moves to the processing of step S1103. In step S1103, the control unit 101 performs predetermined device authentication processing determined by the reader/writer 200 and NFC via the NFC communication unit 109 and specifies that the reader/writer 200 is the reader/writer 200 with which subsequent data can be exchanged.

Next, in step S1104, the control unit 101 determines whether or not the application launch information has been received via the NFC communication unit 109. The control unit 101 references the application launch information from the NDEF-format data received via the NFC communication unit 109 and reads out the data needed to launch the application, such as the name of the application that is to be executed, the application package, version, and the like. The control unit 101 may determine whether or not the launch information written in the record is a script that can launch the application. If it is determined that normal launch information has been received, the control unit 101 moves to the processing of step S1105. If the application launch information is not received within a predetermined amount of time, or if the received launch information cannot be executed, the control unit 101 ends the processing of the present flowchart. For example, if an OS that is different from the OS of the device is written as the launch information, it is determined that the launch information cannot be executed.

In step S1105, the control unit 101 responds to the application launch information received from the reader/writer 200 via the NFC communication unit 109 and moves to the processing of step S1106. Furthermore, in step S1106, the control unit 101 launches the application in accordance with the application launch information received in step S1104, and upon completing the launch of the application, moves to the processing of step S1107. The control unit 101 executes the processing of the subsequent steps by executing the application. Accordingly, the specific processing with respect to the data managed by the application, such as the NDEF data sent and received via the NFC communication unit 109 for the processing ID, is possible.

In step S1107, the control unit 101 determines whether or not a request to send the processing ID has been received from the reader/writer 200. If a signal requesting the processing ID received via the NFC communication unit is received by the reader/writer 200, the control unit 101 moves to the processing of step S1108. If the request for the processing ID is not received within a predetermined amount of time, the control unit 101 ends the processing for the present flowchart. In step S1108, the control unit 101 reads out the processing ID stored in the storage unit 106 by executing the application, and sends the read-out processing ID to the reader/writer 200 via the NFC communication unit 109. The processing of the present flowchart moves from step S1108 to step S1109.

In step S1109, the control unit 101 executes predetermined control such as payment processing by executing the launched application, and when the predetermined control ends, the processing of the present flowchart ends. The control unit 101 performs data exchange with the reader/writer via an NFC communication unit 109 as needed during execution of the application.

By launching the appropriate application of the mobile phone 100 at an appropriate timing using the processing above, it is possible to realize functions needed between the mobile phone 100 and the reader/writer 200 via near field communication. In particular, the desired function is realized by launching the predetermined application also in the case where the application is closed when near the reader/writer 200.

Note that the present embodiment has been described as an embodiment in which the server 300 is used, but it is possible to allow the processing of the server 300 and the reader/writer 200 to be performed by the same device so that processing is executed directly between the mobile phone 100 and the reader/writer 200 without using the server 300. Also, in the present embodiment, the mobile phone 100 may be the NFC reader/writer or the Peer mode initiator and perform communication by periodically polling the reader/writer 200. Also, the mobile phone 100, the reader/writer 200, and the server 300 according to the present invention can also be realized using a system constituted by multiple apparatuses.

According to the present embodiment, by performing notification of the application launch method in advance from the mobile phone 100 to the reader/writer 200 by means of wireless communication, it is possible to launch and execute the application when NFC communication is performed.

As described above, according to the present invention, it is possible to launch and execute an appropriate application for realizing a function using multiple types of communication methods.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-029964, filed Feb. 19, 2014, which is hereby incorporated by reference herein in its entirety.

What is claimed is:

1. A communication apparatus comprising:
a first communication unit;
a second communication unit that is different from the first communication unit; and
a control unit configured to control processing in which the first and second communication units are used,
wherein the control unit performs control such that
information regarding an application needed for processing performed using the second communication unit is sent to a first apparatus using the first communication unit,
a signal based on the information regarding the application is received using the second communication unit from the first apparatus or a second apparatus connected with the first apparatus and the application is launched in accordance with the signal, and
processing performed using the second communication unit is executed using the launched application,
wherein the second communication unit is a communication unit whose communication distance is shorter than that of the first communication unit.

2. The apparatus according to claim 1, wherein
the information regarding the application includes information regarding an operating system on which the application runs.

3. The apparatus according to claim 1, wherein
the control unit furthermore performs control such that if a signal for determining whether or not the communication apparatus exists within a communicable range of the second apparatus is received via the second communication unit, a response to the signal is sent to the second apparatus using the second communication unit.

4. The apparatus according to claim 1, wherein
the information regarding the application includes identification information for the communication apparatus.

5. The apparatus according to claim 1, wherein
the control unit furthermore performs control such that
information specifying the information regarding the application sent using the first communication unit is received from the first apparatus via the first communication unit, and
the specifying information is sent to the second apparatus using the launched application and the second communication unit.

6. The apparatus according to claim 1, wherein
the second communication unit uses near field communication.

7. The apparatus according to claim 1, wherein
the second communication unit performs communication using NFC, and
the control unit uses the first communication unit to send information regarding the application and information regarding a type of a data format used by the second communication unit to the first apparatus.

8. The apparatus according to claim 1, wherein
if the application is launched in response to the signal based on the information regarding the application being received from the second apparatus using the second communication unit, the control unit uses the launched application to execute processing performed using the second communication unit without requiring a user operation.

9. A control method for a communication apparatus, the communication apparatus comprising a first communication unit, a second communication unit that is different from the first communication unit, wherein the second communication unit is a communication unit whose communication distance is shorter than that of the first communication unit, and a control unit configured to control processing in which the first and the second communication units are used, the control method comprising:
sending information regarding an application needed for processing performed using the second communication unit to a first apparatus using the first communication unit;
receiving a signal using the second communication unit based on the information regarding the application from the first apparatus or a second apparatus connected with the first apparatus;
launching the application in accordance with the signal; and
executing, using the launched application, processing performed using the second communication unit.

10. A non-transitory computer-readable storage medium storing a program causing a computer comprising a first communication unit and a second communication unit being different from the first communication unit to perform a method comprising:
sending information regarding an application needed for processing performed using the second communication unit to a first apparatus using the first communication unit:
receiving a signal using the second communication based on the information regarding the application from the first apparatus or a second apparatus connected with the first apparatus;
launching the application in accordance with the signal; and
executing, using the launched application, processing performed using the second communication unit.

11. An information processing apparatus comprising:
a reception unit configured to receive information including identification information for a communication apparatus, application information sent by the communication apparatus and information regarding an operating system which is installed on the communication apparatus;
a determination unit configured to determine whether or not the communication apparatus exists within a communicable range based on the identification information, and
a sending unit configured to, if it is determined by the determination unit that the communication apparatus exists within the communicable range, send a request including information based on the application information to the communication apparatus,
wherein a format of the request corresponds to the operating system.

12. The apparatus according to claim 11, further comprising:
an execution unit configured to execute processing designated for an application that is specified using the information received by the reception unit and is to be launched in the communication apparatus.

13. The apparatus according to claim 11, wherein
the sending unit sends the request including information based on the application information to the communication apparatus using near field communication.

14. A control method for an information processing apparatus comprising:
receiving information including identification information for a communication apparatus, application information sent by the communication apparatus and information regarding an operating system which is installed on the communication apparatus;
determining whether or not the communication apparatus exists within a communicable range based on the identification information; and
sending a request including information based on the application information to the communication apparatus if it is determined that the communication apparatus exists within the communicable range,
wherein a format of the request corresponds to the operating system.

15. A non-transitory computer-readable storage medium storing a program for causing a computer to a control method comprising:
receiving information including identification information for a communication apparatus, application information sent by the communication apparatus and information regarding an operating system which is installed on the communication apparatus;
determining whether or not the communication apparatus exists within a communicable range based on the identification information; and
sending a request including information based on the application information to the communication apparatus if it is determined that the communication apparatus exists within the communicable range,
wherein a format of the request corresponds to the operating system.

* * * * *